United States Patent [19]
Yoshizaki et al.

[11] Patent Number: 6,027,543
[45] Date of Patent: Feb. 22, 2000

[54] METHOD FOR REMOVING A HEAVY METAL FROM SLUDGE

[75] Inventors: Shiro Yoshizaki, 15-1, Azasotobiraki, Komatsushima, Tokushima, Japan, 773; Tahei Tomida, Myozai-gun, Japan

[73] Assignee: Shiro Yoshizaki, Japan

[21] Appl. No.: 08/870,502

[22] Filed: Jun. 6, 1997

[30] Foreign Application Priority Data

Jun. 7, 1996 [JP] Japan ..................................... 8-168484

[51] Int. Cl.⁷ ............................. C05F 11/08; B01D 21/02; B01D 11/00; A62D 3/00
[52] U.S. Cl. ........................... 71/11; 71/12; 71/13; 71/15; 588/236; 210/912; 210/724; 423/27; 423/68; 423/98; 423/109
[58] Field of Search ..................................... 71/11, 12, 13, 71/15; 588/236; 210/912, 724; 423/109, 27, 68, 98

[56] References Cited

U.S. PATENT DOCUMENTS

| | | | |
|---|---|---|---|
| 3,776,856 | 12/1973 | Scheffler | 252/301.1 |
| 3,843,516 | 10/1974 | Yamada et al. | 210/22 |
| 4,013,754 | 3/1977 | Stauter et al. | 423/27 |
| 4,069,295 | 1/1978 | Sugahara et al. | 423/9 |
| 4,124,462 | 11/1978 | Reinhardt et al. | 204/119 |
| 4,438,077 | 3/1984 | Tsui | 423/7 |
| 4,519,831 | 5/1985 | Moore . | |
| 4,562,048 | 12/1985 | Moles et al. | 423/81 |
| 4,671,882 | 6/1987 | Douglas et al. | 210/720 |
| 4,966,715 | 10/1990 | Ahsan et al. . | |
| 4,986,970 | 1/1991 | Haraldson | 423/321 |
| 5,009,793 | 4/1991 | Muller | 210/710 |
| 5,415,847 | 5/1995 | Robinson . | |
| 5,732,367 | 3/1998 | Yost et al. | 588/16 |

FOREIGN PATENT DOCUMENTS

| | | | |
|---|---|---|---|
| 1045729 | 1/1979 | Canada | C02C 05/02 |
| 0 568 903 | 11/1993 | European Pat. Off. . | |
| 55-8885 | 1/1980 | Japan . | |
| 58011799 | 1/1983 | Japan . | |
| 0110440 | 4/1989 | Japan . | |
| 05293496 | 11/1993 | Japan . | |

OTHER PUBLICATIONS

D. S. Scott et al., Removal of Phosphates and Metals From Sewage Sludges, vol. 9, No. 9, pp. 849–855, 1975.

J. W. Oliver et al., Heavy Metal Release By Chlorine Oxidation of Sludges, vol. 47, No. 10, pp. 2490–2497, 1975.

B. G. Oliver et al., Acid Solubilization of Sewage Sludge and Ash Constituents for Possible Recovery, vol. 10, pp. 1077–1081, vol. 15, 1976.

K. Sato et al., Removal of Heavy Metals from Sewage Sludge, vol. 15, No. 10, pp. 813–817, 1986.

M. Hashimoto et al., Study of Leaching of Metal–Containing Sludge By Sulfer Bacteria, vol. 28, No. 5, pp. 285–300, 1987.

Nippon Gesuido Kyokai, General Sludge Test, pp. 300–302, 1989.

Sato et al., Removal of Heavy Metals from Sewage Sludges, vol. 15, p813–817, Oct. 1986.

Ehreth et al., The Role of Composting and Other Beneficial Use Options in Municipal Sludge Management, p6–14, Aug. 1977.

Primary Examiner—Gary P. Straub
Assistant Examiner—Melanie C. Wong
Attorney, Agent, or Firm—Wenderoth, Lind & Ponack, L.L.P.

[57] ABSTRACT

A method for removing a heavy metal from sludge, including the step of putting the sludge into contact with a treating liquid to dissolve the heavy metal contained in the sludge into the treating liquid. The treating liquid is formed of either A or B, where (A) is an aqueous solution of phosphoric acid, and (B) is an aqueous solution of phosphoric acid containing at least one of B1 and B2, where (B1) is at least one acid other than phosphoric acid, and (B2) is at least one oxidant. The concentration of the phosphoric acid in the treating liquid is 3% by weight or more. Alternatively, the sludge is put into contact with the treating liquid at a temperature of 40° C. or higher.

8 Claims, No Drawings

METHOD FOR REMOVING A HEAVY METAL FROM SLUDGE

BACKGROUND OF THE INVENTION

1. Field of the Invention

The present invention relates to a method for removing harmful heavy metals, from various types of sludge, which prevent effective use or safe dumping of the sludge.

2. Description of the Related Art

It is known that sewage sludge, sludge from human waste, and sludge from food plants contain harmful heavy metals. Such organic sludge can be used as, for example, compost by fermentation. It is not easy to remove the heavy metals from the sludge before or after fermentation.

The sludge is generated in a large quantity and, today, is thrown away as it is or incinerated. The heavy metals contained in the sludge or ash generated as a result of incineration may possibly contaminate the dump site, or vaporize and scatter into the air and cause environmental pollution. Accordingly, it is an urgent and important task to develop a method for efficiently rendering the sludge non-harmful.

Various methods have been developed for removing heavy metals from the sludge.

For example, Scott et al. have attempted removing heavy metals using various acids, and reported that zinc, copper, iron and the like can be removed by adding sulfuric acid to sewage sludge in water so that the resultant mixture has a pH of about 1.5 and then boiling the mixture (Environ. Sci. Technol., 9(9), 849–855 (1975)). This method was studied later for industrial use as "hot-acid treatment", but was not put into practice.

Oliver et al. have reported a method of oxidizing sewage sludge by chlorine and described that zinc, nickel and the like can be removed by hydrochloric acid (pH 3.5) generated in the process of this method (J. WPCF, 47(10), 2490–2497 (1975)).

Oliver. et al. have reported that heavy metals contained in sewage sludge, for example, cadmium, chromium, copper, iron, lead, zinc and nickel can be removed using a sulfuric acid or hydrochloric acid solution of pH 1.5 at room temperature (Water Res., 10, 1077–1081 (1976)). This method can remove nickel at a relatively high ratio of 80% or more, but can remove other materials at a ratio of only about 50%. Specifically, copper is removed only at a ratio of 18% either by the sulfuric acid or hydrochloric acid solution.

Japanese Laid-Open Patent Publication No. 55-8885 discloses that lead, zinc and cadmium in sewage sludge can be removed using a mixture (pH 1–1.5) of hydrochloric acid and an aqueous solution of hydrogen peroxide. However, copper and nickel are removed at a relatively low ratio of about 50 to 70% by this method.

Satoh et al. have reported a method of treating digested sewage sludge by using an aqueous solution of hydrogen peroxide and then adding an acid, and also a method of treating the digested sewage sludge by an acid while conducting aeration (Kankyo Gijutsu, 15(10), 813–817 (1986)). By the method using an aqueous solution of hydrogen peroxide and acid, the acid is added so that the final concentration of the acid in a mixture of the treating solution and the digested sewage sludge is 0.5 N. Usable acids include nitric acid, hydrochloric acid, sulfuric acid, and phosphoric acid. It has been reported that when nitric acid is used, copper, zinc, cadmium and lead can be removed at a ratio of 80% or more. When phosphoric acid (phosphoric acid content: about 1.6% wt/vol) is used, the removing ratios of most heavy metals are low as follows: copper: 16.6%; zinc: 56.9%; cadmium: 27.5%; and lead: 3.2%.

Nakayama et al. have studied a method for removing heavy metals using bacterial leaching, and Hashimoto et al. have showed that the heavy metals are dissolved by sulfuric acid generated by sulfur bacteria (Mizushori Gijutsu, 28(5), 13–28 (1987)). Accordingly, the method of Hashimoto et al. is basically the same as the methods using sulfuric acid.

Japanese Laid-Open Patent Publication No. 1-104400 describes that mercury, cadmium and lead are removed by treating the sludge generated by the process of treating waste water obtained in the process of incinerating garbage from households or dumped refuse, using hypochlorous acid or hypochlorite and then using a mineral acid.

As described above, various methods have been developed and studied, but all these methods have drawbacks that use of dangerous acids such as sulfuric acid, nitric acid, and hypochlorous acid is required or it is difficult to remove the heavy metals efficiently. Accordingly, none of the above-described methods have been put into practice.

SUMMARY OF THE INVENTION

According to one aspect of the invention, a method for removing a heavy metal from sludge includes the step of:
putting the sludge into contact with a treating liquid to form a mixture and dissolve the heavy metal contained in the sludge into the treating liquid, wherein:
the treating liquid is formed of either A or B:
(A): an aqueous solution of phosphoric acid, and
(B): an aqueous solution of phosphoric acid containing at least one of B1 and B2:
(B1): at least one acid other than phosphoric acid, and
(B2): at least one oxidant, and
wherein the concentration of the phosphoric acid in the mixture is 3% by weight or more.

According to another aspect of the invention, a method for removing a heavy metal from sludge includes the step of:
putting the sludge into contact with a treating liquid to dissolve the heavy metal contained in the sludge into the treating liquid, wherein:
the treating liquid is formed of either A or B:
(A): an aqueous solution of phosphoric acid, and
(B): an aqueous solution of phosphoric acid containing at least one of B1 and B2:
(B1): at least one acid other than phosphoric acid, and
(B2): at least one oxidant, and
wherein the sludge is put into contact with a treating liquid at a temperature of 40° C. or higher.

In one embodiment of the invention, the sludge is at least one selected from the group consisting of sewage sludge, sludge from human waste, sludge from a food plant, and ash generated by incinerating one of the sewage sludge, the sludge from human waste and the sludge from a food plant.

In another embodiment of the invention, the method further includes the step of removing the heavy metal from the treating liquid by putting an adsorbent into contact with the treating liquid containing the heavy metal dissolved therein.

In still another embodiment of the invention, a compost is obtained by fermenting the sludge obtained as a result of removing the heavy metal therefrom by the above-described method.

In yet another embodiment of the invention, a fertilizer includes the sludge obtained as a result of removing the heavy metal therefrom by the above-described method.

Thus, the invention described herein makes possible the advantages of (1) providing a method for efficiently removing heavy metals from sludge or ash generated by incinerating sludge, which has conventionally been difficult; (2) providing a method for removing heavy metals such as mercury, chromium, lead, copper and cadmium from the sludge or ash more easily than by conventional methods; (3) providing an inexpensive and industrially-usable method for removing heavy metals from the sludge or ash; and (4) providing useful resources using the sludge from which the heavy metals have been efficiently removed, for example, providing a compost rich in organic materials by fermenting such sludge or a fertilizer containing the fermented sludge.

These and other advantages of the present invention will become apparent to those skilled in the art upon reading and understanding the following detailed description.

DESCRIPTION OF THE PREFERRED EMBODIMENTS

Sewage sludge generally contains heavy metals, but the water layer of the sewage hardly contains any heavy metal. This phenomenon occurs because heavy metals accumulate in microorganisms included in the sewage sludge, but the mechanism of the accumulation has not been clarified in detail. The present inventors assumed that it is mainly due to biosorption of heavy metals by microorganisms included in the sewage sludge that the sewage sludge contains a much larger amount of heavy metals than the water layer. As a result of active research and studies, the present inventors found that an aqueous solution of phosphoric acid which is considered to have affinity to the microorganisms efficiently elutes heavy metals in the sludge and reached the present invention.

The sludge from which heavy metals are to be removed by the present invention is known organic sludge and includes any type of sludge from which heavy metals need to be removed. Such types of sludge include, for example, sewage sludge, sludge from human waste including human excrement, and sludge from food plants. In this specification, these different types of sludge and ash generated by incinerating such sludge will be comprehensively referred to as "sludge". The sludge can be in the form of either concentrated sludge (raw sludge), digested sludge, or filter cake.

Heavy metals which need to be removed from the sludge can be any usual heavy metal, for example, Fe, Cr, Co, Cu, Sn, Pb, Zn, Cd, Hg, Mn, Mo, and Ni. As can also be removed. In this specification, such usual heavy metals and other substances which can be extracted in the same manner as these heavy metals will be comprehensively referred to as "heavy metals". The heavy metals can be contained either in their elemental state, as ions or complex ions.

The treating liquid used for a method according to the present invention is formed of either A or B, where (A) is an aqueous solution of phosphoric acid, and (B) is an aqueous solution of phosphoric acid containing at least one of B1 and B2, where (B1) is at least one acid other than phosphoric acid, and (B2) is at least one oxidant. The term "condensed phosphoric acid" refer comprehensively to metaphosphoric acid, polyphosphoric acid, diphosphorous pentoxide and the like. The concentration of phosphoric acid contained in the mixture is 85% or less, preferably 3 to 85%. In this specification, the concentrations of phosphoric acid are all represented based on weight (weight/weight) unless otherwise specified. The concentration of the aqueous solution of phosphoric acid in the mixture can be appropriately selected in accordance with which heavy metal among the heavy metals contained in the sludge is mainly to be removed. For example, in order to remove a wide range of heavy metals including mercury and chromium, phosphoric acid at a concentration of 15% to 85%, preferably 15% to 50% is used. In order to remove zinc, copper, arsenic and cadmium, phosphoric acid at a concentration of 15% or less, preferably about 3 to 15%, more preferably 4% to 10% is used. In order to remove a heavy metal from the ash generated as a result of incinerating organic sludge, it is preferable to use phosphoric acid at a relatively high concentration of, for example, 15% to 50%. In the case where phosphoric acid is contained in an insufficient amount and the treating temperature is excessively low, the heavy metals, especially, mercury, chromium, lead and copper are removed at a relatively low ratio. When phosphoric acid is utilized in an excessively large amount, such a large amount does not enhance the removal effect in proportion to the amount used. The phosphoric acid in the treating liquid has affinity to microorganisms included in the sludge, and is considered to efficiently elute heavy metals accumulated in the microorganisms by biosorption.

The oxidant contained in the treating liquid can be hydrogen peroxide, hypochlorous acid, potassium hypochlorite, sodium hypochlorite, potassium permanganate or the like. The oxidation effect can also be obtained by, for example, blowing air by aeration or adding ozone in lieu of adding such an oxidant. An aqueous solution of phosphoric acid containing hydrogen peroxide as an oxidant can be prepared by performing electrolysis of the aqueous solution of phosphoric acid. The oxidant is contained in the treating liquid at a ratio of 500 weight parts or less, preferably 200 weight parts or less, more preferably 100 weight parts or less, and most preferably 0.01 to 100 weight parts with respect to 100 weight parts of phosphoric acid. In the case where hydrogen peroxide is used as the oxidant, hydrogen peroxide is generally contained in the treating liquid at a ratio of 20% (wt/vol) or less, preferably.0.001 to 10% (wt/vol), more preferably 0.01 to 5% (wt/vol). When the oxidant is utilized in an excessive amount, such a large amount does not enhance the effect in accordance with the amount used. An oxidant is particularly effective in improving the removing ratio of copper, and also significantly improves the removing ratios of lead and zinc. Copper is difficult to remove at a high ratio with an aqueous solution containing only phosphoric acid, but is dissolved and removed under the presence of an oxidant. This is considered to suggest that copper exists in its elemental state.

Acids other than phosphoric acid which can be contained in the treating liquid include, for example, inorganic acids such as hydrochloric acid, sulfuric acid, nitric acid and sulfamic acid and organic acids such as formic acid, acetic acid, oxalic acid and citric acid. A phosphate such as sodium phosphate or potassium phosphate can be contained in lieu of or in addition to any of the above-described acid other than phosphoric acid. The above-described acid other than phosphoric acid is contained in the treating liquid at a ratio of 70 weight parts or less, preferably 60 weight parts or less with respect to 100 weight parts of phosphoric acid. The acid other than phosphoric acid is effective in improving the removing ratios of heavy metals, particularly the removing ratio of copper. In the case where an aqueous solution containing phosphoric acid at a relatively low concentration of 3% to 4%, the removing ratio of lead, zinc, mercury and cadmium can also be improved by adding an acid other than phosphoric acid. The acid other than phosphoric acid can improve the removing ratio of copper without using an oxidant. When an aqueous solution containing an acid other than phosphoric acid is contained in an excessive amount, there are drawbacks such that the removing ratios of heavy metals tend to be reduced and that recovery of phosphoric acid from the treating liquid containing the heavy metals becomes more difficult.

By a method according to the present invention, the heavy metals in the sludge are extracted by contacting the sludge to the treating liquid. The treating liquid is generally used in an amount which is 0.1 times the sludge (weight of the treating liquid/volume of the sludge) or more and preferably 0.1 to 10 times the sludge. Generally, an amount which is 1 to 5 times is sufficient. The treating, i.e., extracting temperature can be in the range of about −10° C. to the boiling point of the treating liquid. The extracting temperature generally can be in the range of 0° C. to 95° C., preferably in the range of room temperature to 95° C. Herein, the term "room temperature" refers to a temperature in the range of 10° C. to 25° C. In the case where the temperature is 40° C. or more, preferably in the range of 40° C. to 80° C., more preferably in the range of 50° C. to 70° C., the extraction can be performed efficiently even if the phosphoric acid is contained at a relatively low concentration. When such a high temperature is used, the removing ratio of copper is particularly improved, and furthermore the treatment performed after the sludge contacts the treating liquid, for example, dewatering is easier. The extraction time is in the range of about 10 minutes to one day. Removal of the sludge can be performed with relative ease under these conditions.

The sludge from which the heavy metals have been removed by such treatment is effectively used after dewatering as necessary, or dumped. For example, the sludge after removal of the heavy metals can be used as a fertilizer or fermented into compost. The sludge from which the heavy metals have been removed, even if dumped, does not pollute the environment.

From the treating liquid containing the heavy metals, the heavy metals can be removed as necessary to recover and recycle phosphoric acid. For removing the heavy metals from the treating liquid, known methods can be used. For example, a method of removing heavy metals using an ion exchange resin to regenerate phosphoric acid; a method of adding sodium hydroxide to the treating liquid to convert the phosphoric acid in the treating liquid into sodium phosphate and recovering the resultant sodium phosphate; or a solvent extraction method can be used. In addition, the heavy metals can be removed using an appropriate adsorbent. Before treating the liquid using the adsorbent, neutralization is performed as necessary. As an adsorbent, any adsorbent for adsorbing heavy metals, such as a cation exchange resin or an anion exchange resin can be used. Also as an adsorbent, a part of the sludge from which the heavy metals have been removed can be used. In such a case, the aqueous solution of phosphoric acid can be recovered by causing the heavy metals to be adsorbed to the sludge to remove the heavy metals. By recovering and thus recycling phosphoric acid in this manner, a method according to the present invention can be put into industrial use at relatively low cost.

According to the present invention, removal of hazardous heavy metals from sludge, which has been conventionally difficult, can be efficiently performed using a treating liquid containing phosphoric acid. Particularly, removal of mercury, chromium, lead, copper, cadmium and the like from sludge can be easily performed. As mentioned above, an aqueous solution containing phosphoric acid is used as a treating liquid. Phosphoric acid, which is neither as a strong acid as hydrochloric acid, sulfuric acid or nitric acid and which is not easily vaporized, has advantages of being safe to the operators and being less corrosive and less damaging to the treating equipment. In the case where phosphoric acid is used at a high concentration, phosphoric acid forms an insoluble phosphate film on a surface of iron, aluminum and zinc, thus preventing these metals from being corroded. Thus, the treating equipment is further protected against corrosion and damage. Due to these advantages, a method according to the present invention can easily be carried out industrially. When used at a temperature of 40° C. or more, a method according to the present invention is especially preferable for treating sludge in sewage treatment facilities since the post-treatment such as the dewatering process becomes easier.

The sludge from which heavy metals have been removed obtained by a method according to the present invention can be effectively used as compost containing good quality organic material and phosphates after the residual acid is neutralized using potassium carbonate, slaked lime or the like. The sludge from which heavy metals have been removed can also be used as a fertilizer without any further treatment, or after dried naturally or by heating. The sludge, even if dumped, does not pollute the environment. Thus, according to the present invention, sludge which is generated in a large amount can be recycled.

EXAMPLES

Hereinafter, the present invention will be described by way of illustrative examples with reference to the accompanying drawings.

Example 1

An example of treatment of sewage sludge performed at room temperature using aqueous solutions containing phosphoric acid at various concentrations as the treating liquid will be described.

To 10 g of filter cake of sewage sludge (water content: about 75% (wt/wt)) obtained by the standard activated sludge process used as a sample, 30 ml of each of aqueous solutions containing phosphoric acid at the concentrations shown in Table 1 in the columns of "Example 1" was added, and then stirred at room temperature for 1 hour. Next, the sludge was removed by filtering, and the resultant aqueous solutions of phosphoric acid were each analyzed for the contents of heavy metals using ICPS-5000 (Inductively Coupled Plasma Spectrometer 5000; Shimadzu Seisakusho). The method using ICPS-5000 is referred to as the "ICP method". The analyzed heavy metals were arsenic, cadmium, chromium, copper, iron, mercury, manganese, nickel, lead and zinc.

Separately, the content of each of the heavy metals in the filter cake of sewage sludge used as the sample in the above-described experiment was measured. In detail, the sludge was decomposed in accordance with the nitric acid-hydrochloric acid decomposing method (aqua regia decomposing method) described in "Gesui Shikenhoho (Sewage Test Methods, Japan, 1984)", and the heavy metals in the resultant solution was measured by the ICP method. The above-described nitric acid-hydrochloric acid decomposing method is a method for decomposing sludge using a mixture of nitric acid and hydrochloric acid. Ten grams of the sample was used, and the sludge was decomposed by heating using a mixture of 5 ml of nitric acid and 15 ml of concentrated hydrochloric acid 3 to 5 times in repetition. The contents of the heavy metals were as follows (unit: ppm): arsenic: 170; cadmium: 3.81; chromium: 18.3; copper: 172; iron: 3950;

mercury: 66.4; manganese: 82.1; nickel: 16.9; lead: 57.6; and zinc: 220. In the following examples in this specification, the content of each of the heavy metals in the test sample was measured by this method.

The removing ratio (%) of each heavy metals was calculated based on the content of the heavy metal in the filter cake of sewage sludge and the content of the same heavy metal in each aqueous solution of phosphoric acid. The results are shown in Table 1. As shown in Table 1, the heavy metals was removed at a significant ratio when a 4.25% aqueous solution of phosphoric acid was used. In the case where the phosphoric acid was contained in the treating liquid at a concentration of 8.5% or more, iron was removed at a ratio of about 50%, and lead and zinc were each removed at a ratio of about 70%. The other hazardous heavy metals were each removed at a ratio of 80% or more except for copper. These results were better than those obtained by conventional methods. In this specification, the concentrations of heavy metals are all represented based on weight (i.e., weight/weight). In Tables 1 through 4 (Tables 2 through 4 will be described later), the removing ratios of mercury and chromium significantly exceed 100%. This is considered to occur because of the following causes. In this specification, the nitric acid-hydrochloric acid decomposing method (aqua regia decomposing method) is used for determining the content of each heavy metal martial in the sludge. The content of mercury, which partially vaporizes and scatters in the process of the nitric acid-hydrochloric acid decomposing method, is considered to be detected as being lower than the actual value. Chromium, which is assumed to be adsorbed to the sludge as chromates or bichromates, is considered to form compounds which are difficult to dissolve in an acid during the process of decomposing the sludge by aqua regia. Accordingly, the content of chromium is considered to be detected as being lower than the actual value.

Comparative Example 1

The treatment was performed in the same manner as in Example 1 except that aqueous solutions containing phosphoric acid at the concentrations shown in Table 1 in the columns of "Comparative example 1" were used as the treating liquid. In addition, the same treatment as in Example 1 was performed using each of 30 ml of water and 30 ml of 1 N hydrochloric acid. The results are shown in Table 1.

TABLE 1

| Treating liquid | Removing ratio of heavy metal (%) | | | | | | | | | |
|---|---|---|---|---|---|---|---|---|---|---|
|  | As | Cd | Cr | Cu | Fe | Hg | Mn | Ni | Pb | Zn |
| Example 1 | | | | | | | | | | |
| Phosphoric acid (42.5%) | 88 | 116 | 183 | 9 | 54 | 186 | 80 | 83 | 81 | 71 |
| Phosphoric acid (21.2%) | 85 | 94 | 98 | 7 | 54 | 123 | 81 | 81 | 70 | 73 |
| Phosphoric acid (8.5%) | 85 | 84 | 64 | 6 | 45 | 86 | 86 | 80 | 65 | 75 |
| Phosphoric acid (4.25%) | 78 | 59 | 45 | 6 | 31 | 55 | 84 | 76 | 30 | 65 |
| Comparative Example 1 | | | | | | | | | | |
| Phosphoric acid (2.12%) | 44 | 22 | 25 | 5 | 17 | 26 | 63 | 49 | 25 | 46 |
| Phosphoric acid (0.85%) | 13 | 5 | 3 | 5 | 4 | 11 | 32 | 17 | 11 | 9 |
| Phosphoric acid (0.425%) | 6 | 4 | 2 | 5 | 0 | 2 | 6 | 5 | 7 | 1 |
| Water | 2 | 0 | 1 | 2 | 1 | 0 | 2 | 2 | 3 | 0 |
| 1 N hydrochloric acid | 85 | 70 | 51 | 56 | 54 | 72 | 81 | 77 | 107 | 84 |

It is understood from Table 1 that the heavy metals can be effectively removed by the method used in Example 1. Particularly when a high concentration aqueous solution of phosphoric acid is used, the heavy metals can be effectively removed except for copper. The removing ratios are higher than where a mineral acid such as hydrochloric acid is used.

Example 2

An example of treatment of sewage sludge performed at room temperature using aqueous solutions containing phosphoric acid at various concentrations and an oxidant as the treating liquid will be described.

To 10 g of filter cake (water content: 75% (wt/wt)) of sewage sludge obtained by the standard activated sludge process, 30 ml of each of aqueous solutions containing phosphoric acid at the concentrations shown in Table 2 in the columns of "Example 2" was added, the aqueous solutions each containing 2% hydrogen peroxide, and then stirred at room temperature for 1 hour. Next, the sludge was removed by filtering, and the resultant aqueous solutions were each analyzed for the contents of the heavy metals by the ICP method. The removing ratios of the heavy metals are shown in Table 2. In this specification, the concentrations of hydrogen peroxide are all represented based on weight/volume unless otherwise specified.

Comparative Example 2

The treatment was performed in the same manner as in Example 2 except that aqueous solutions containing phosphoric acid at the concentrations shown in Table 2 in the columns of "Comparative example 2" were used as the treating liquid. Then, the treatment was performed in the same manner as in Example 2, using either one of a 2% aqueous solution of hydrogen peroxide or 0.93 N hydrochloric acid containing 2% of hydrogen peroxide as the treating liquid. The results are shown in Table 2.

TABLE 2

| Treating liquid | Removing ratio of heavy metal (%) | | | | | | | | | |
|---|---|---|---|---|---|---|---|---|---|---|
|  | As | Cd | Cr | Cu | Fe | Hg | Mn | Ni | Pb | Zn |
| Example 2 | | | | | | | | | | |
| Phosphoric acid (40%) +$H_2O_2$[a] | 91 | 111 | 168 | 92 | 50 | 165 | 82 | 87 | 100 | 79 |
| Phosphoric acid (20%) +$H_2O_2$[a] | 87 | 95 | 95 | 83 | 50 | 113 | 80 | 85 | 101 | 81 |
| Phosphoric acid (8%) +$H_2O_2$[a] | 87 | 88 | 64 | 78 | 43 | 79 | 85 | 83 | 85 | 89 |
| Phosphoric acid (4%) +$H_2O_2$[a] | 78 | 69 | 47 | 67 | 27 | 51 | 83 | 82 | 34 | 89 |

TABLE 2-continued

| Treating liquid | Removing ratio of heavy metal (%) | | | | | | | | | |
|---|---|---|---|---|---|---|---|---|---|---|
| | As | Cd | Cr | Cu | Fe | Hg | Mn | Ni | Pb | Zn |
| Comparative Example 2 | | | | | | | | | | |
| Phosphoric acid (2%) +H$_2$O$_2$[a)] | 40 | 38 | 25 | 39 | 5 | 18 | 61 | 56 | 23 | 83 |
| Phosphoric acid (0.8%) +H$_2$O$_2$[a)] | 13 | 9 | 7 | 13 | 0 | 5 | 31 | 23 | 15 | 43 |
| Phosphoric acid (0.4%) +H$_2$O$_2$[a)] | 9 | 2 | 0 | 7 | 0 | 1 | 7 | 6 | 8 | 6 |
| 2% H$_2$O$_2$ | 2 | 3 | 0 | 5 | 0 | 3 | 4 | 6 | 6 | 1 |
| 0.93 N hydrochloric acid[b)] | 85 | 61 | 52 | 72 | 45 | 53 | 78 | 73 | 105 | 84 |

[a)]Concentration of H$_2$O$_2$ is 2%.
[b)]0.93 N hydrochloric acid was prepared by adding 2 ml of a 30% aqueous solution of hydrogen peroxide to 28 ml of 1 N hydrochloric acid.

As shown in Table 2, the removing ratio of iron is relatively low, but the removing ratios of the other heavy metals are satisfactory. As can be understood from these results, copper can be effectively removed by a system containing an oxidant. In the case where phosphoric acid is contained at a concentration of 40%, the removing ratio of mercury is slightly lower than in the case where phosphoric acid is contained at a concentration of 42.5% in Example 1. This is attributed to the difference in concentrations of phosphoric acid but not to the addition of the oxidant.

Example 3

An example of treatment of concentrated sewage sludge performed at room temperature will be described.

To 100 g of concentrated sludge (water content: 97% (wt/wt)), 10 g of an 85% aqueous solution of phosphoric acid and 6 ml of a 30% aqueous solution of hydrogen peroxide were added, and then stirred at room temperature for 1 hour. The sludge was removed by filtering, and the resultant aqueous solution was analyzed for the contents of the heavy metals by the ICP method. The removing ratios of the heavy metals were as follows: arsenic: 84%; cadmium: 83%; chromium: 58%; copper: 78%; iron: 38%; mercury: 71%; manganese: 88%; nickel: 80%; lead: 82%; and zinc: 90%.

Example 4

An example of treatment of sewage sludge performed at room temperature using condensed phosphoric acid will be described. As the condensed phosphoric acid, commercially available polyphosphoric acid which is indicated to have a phosphoric acid content of 116% was used.

To 3.0 g of polyphosphoric acid, 2 ml of a 30% aqueous solution of hydrogen peroxide was added, and water was added to prepare a 30 ml treating liquid. To the resultant solution, 10 g of filter cake (water content: 75% (wt/wt)) of sewage sludge was added and stirred for 24 hours. The sludge was removed by filtering, and the resultant aqueous solution was analyzed for the contents of the heavy metals by the ICP method. The removing ratios of the heavy metals were as follows: arsenic: 88%; cadmium: 91%; chromium: 75%; copper: 80%; iron: 45%; mercury: 85%; manganese: 84%; nickel: 89%; lead: 91%; and zinc: 88%.

Example 5

An example of treatment of sewage sludge performed at room temperature using an aqueous solution containing phosphoric acid, sulfuric acid, and an oxidant as the treating liquid will be described.

To 10 g of filter cake (water content: 75% (wt/wt)) of sewage sludge, 14 ml of an 8.5% aqueous solution of phosphoric acid, 14 ml of 1 N sulfuric acid, and 2 ml of a 30% aqueous solution of hydrogen peroxide were added, and then stirred at room temperature for 1 hour. Next, the sludge was removed by filtering, and the resultant aqueous solution was analyzed for the contents of the heavy metals by the ICP method. The removing ratios of the heavy metals were as follows: arsenic: 69%; cadmium: 77%; chromium: 59%; copper: 75%; iron: 44%; mercury: 62%; manganese: 82%; nickel: 81%; lead: 58%; and zinc: 86%.

Example 6

An example of treatment of sewage sludge performed at room temperature using an aqueous solution containing phosphoric acid, hydrochloric acid, and an oxidant as the treating liquid will be described.

To 10 g of filter cake (water content: 75% (wt/wt)) of sewage sludge, 29 ml of an 8.5% aqueous solution of phosphoric acid, 10 ml of 1 N hydrochloric acid, and 1 ml of a 30% aqueous solution of hydrogen peroxide were added, and then stirred at room temperature for 5 hours. Next, the sludge was removed by filtering, and the resultant aqueous solution was analyzed for the contents of the heavy metals by the ICP method. The removing ratios of the heavy metals were as follows: arsenic: 86%; cadmium: 81%; chromium: 59%; copper: 76%; iron: 44%; mercury: 71%; manganese: 82%; nickel: 80%; lead: 94%; and zinc: 87%.

Example 7

An example of treatment of sewage sludge performed at room temperature using a combination of a treating liquid containing phosphoric acid and ozone oxidation will be described.

To 10 g of filter cake (water content: 75% (wt/wt)) of sewage sludge, 50 ml of an 8.5% aqueous solution of phosphoric acid was added, and then was stirred at room temperature for 3 hours while ozone gas was introduced. After the reaction was completed, the sludge was removed by filtering, and the resultant aqueous solution was analyzed for the contents of the heavy metals by the ICP method. The removing ratio of copper was 84%.

Example 8

The influence of the treating temperature on the removing ratios of the heavy metals will be described.

To 10.0 g of filter cake of sewage sludge obtained by the standard activated sludge process (water content: about 75% (wt/wt)), 30 ml of a treating liquid was added, and then was stirred and mixed at each of room temperature and 60° C. for 1 hour. As the treating liquid, the aqueous solutions containing phosphoric acid at the concentrations shown in Table 3 in the columns of "Example 8" were used. One of the aqueous solutions used contained no hydrogen peroxide, and the other aqueous solutions contained 2t or 0.2% hydrogen peroxide. Next, the sludge was removed by filtering, and the resultant aqueous solution was analyzed for the contents of the heavy metals by the ICP method. The contents of the heavy metals in the filter cake were as follows (unit: ppm): copper: 61.0; chromium: 17.1; and zinc: 195. The removing ratios of the heavy metals are shown in Table 3.

Comparative Example 3

The treatment was performed in the same manner as in Example 8 except that a 2% aqueous solution of phosphoric acid containing 2% hydrogen peroxide was used as the treating liquid and that the treatment was performed only at room temperature. The results are shown in Table 3.

TABLE 3

| | Treating liquid | Temp. | Removing ratio of heavy metal (%) | | |
|---|---|---|---|---|---|
| | | | Cu | Cr | Zn |
| Example 8 | Phosphoric acid (40%) +$H_2O_2$ a) | RT | 90 | 124 | 89 |
| | | 60° C. | 100 | 134 | 90 |
| | Phosphoric acid (20%) +$H_2O_2$ a) | RT | 86 | 75 | 89 |
| | | 60° C. | 99 | 87 | 91 |
| | Phosphoric acid (8%) +$H_2O_2$ a) | RT | 81 | 56 | 86 |
| | | 60° C. | 93 | 67 | 89 |
| | Phosphoric acid (5%) +$H_2O_2$ a) | RT | 74 | 40 | 88 |
| | | 60° C. | 89 | 44 | 88 |
| | Phosphoric acid (3%) +$H_2O_2$ a) | RT | 62 | 33 | 83 |
| | | 60° C. | 78 | 30 | 84 |
| | Phosphoric acid (2%) +$H_2O_2$ a) | 60° C. | 66 | 18 | 73 |
| | Phosphoric acid (3%) | RT | 5 | 34 | 54 |
| | | 60° C. | 6 | 37 | 61 |
| | Phosphoric acid (20%) +$H_2O_2$ a) | RT | 86 | 73 | 89 |
| | Phosphoric acid (40%) +$H_2O_2$ a) | RT | 89 | 122 | 90 |
| Comparative example 3 | Phosphoric acid (2%) +$H_2O_2$ a) | RT | 52 | 19 | 74 |

RT: room temperature
a) Concentration of $H_2O_2$ is 2.0%.
b) Concentration of $H_2O_2$ is 0.2%.

As can be understood from Table 3, the removing ratio of copper is higher by 10% to 30% in the case where the treatment is performed at 60° C. than in the case where the treatment is performed at room temperature. The removing ratio of chromium also tends to be improved when heated. By contrast, the removing ratio of zinc does not change irrespective of the temperature. By treating the sludge with heat, the dewaterability after the treatment is improved. In the case where a 5% aqueous solution of phosphoric acid was used for the treatment, the filtering rate was about 6 times higher when the treatment was performed under heating than when the treatment was performed at room temperature.

Example 9

An example of treatment of sludge performed with a treating liquid under reflex conditions will be described.

To 10.0 g of filter cake (water content: 75% (wt/wt)) of sewage sludge obtained by the standard activated sludge process, 30 ml of a 5% aqueous solution of phosphoric acid containing 2% hydrogen peroxide was added, and then the mixture was refluxed with stirring for 1 hour. The resultant mixture of treating liquid and sludge was filtered to remove the sludge. The resultant treating liquid was analyzed for the contents of the heavy metals by the ICP method. The removing ratio of copper was 95%.

Example 10

An example of treatment of concentrated sludge performed while the treating liquid was heated will be described.

To 100 g of concentrated sludge (water content: 97% (wt/wt)), 10 g of an 85% aqueous solution of phosphoric acid and 6 ml of a 30% aqueous solution of hydrogen peroxide were added, and then was stirred at 60° C. for 1 hour. The resultant mixture of treating liquid and sludge was filtered to remove the sludge. The resultant treating liquid was analyzed for the contents of the heavy metals by the ICP method. The removing ratios of the heavy metals were as follows: copper: 88%; chromium: 65%; and zinc: 90%.

Example 11

An example of treatment of sewage sludge in a farming village either at room temperature or while heating will be described.

To 10.0 g of filter cake (sample; water content: 83% (wt/wt)) of sewage sludge in a farming village obtained by the oxidation ditch process, 30 ml of aqueous solutions each containing phosphoric acid at the concentrations shown in Table 4 was added, each aqueous solution containing 2% hydrogen peroxide, and then was stirred at room temperature for 1 hour. From each of the resultant mixtures of treating liquid and sludge, the sludge was removed by filtering. The resultant treating liquids were analyzed for the contents of the heavy metals by the ICP method. The contents of the heavy metals in the sludge used as the sample were as follows (unit: ppm): arsenic: 33.7; cadmium: 1.28; chromium: 5.59; copper: 31.1; iron: 3620; mercury: 124; manganese: 14.0; nickel: 1.54; lead: .7.80; and zinc: 173. The removing ratios of the heavy metals are shown in Table 4.

Separately, the treatment was performed at 60° C. using each of a 20% aqueous solution of phosphoric acid containing 2% hydrogen peroxide and an 8% aqueous solution of phosphoric acid containing 2% hydrogen peroxide. The removing ratios of the heavy metals were, respectively, as follows: copper: 88% and 84%; chromium: 111% and 78%; and zinc: 83% and 89%.

TABLE 4

| Treating liquid | Removing ratio of heavy metal (%) | | | | | | | | | |
|---|---|---|---|---|---|---|---|---|---|---|
| | As | Cd | Cr | Cu | Fe | Hg | Mn | Ni | Pb | Zn |
| Phosphoric acid (40%) +$H_2O_2$ a) | 95 | 116 | 165 | 80 | 83 | 163 | 83 | 103 | 113 | 85 |
| Phosphoric acid (20%) +$H_2O_2$ a) | 97 | 105 | 102 | 78 | 76 | 119 | 86 | 107 | 117 | 90 |
| Phosphoric acid (8%) +$H_2O_2$ a) | 91 | 98 | 74 | 72 | 66 | 93 | 84 | 106 | 97 | 91 |
| Phosphoric acid (4%) +$H_2O_2$ a) | 81 | 71 | 51 | 69 | 39 | 62 | 81 | 97 | 66 | 85 | a) Concentration of $H_2O_2$ is 2%.

Example 12

Sludge from human waste was treated in the following manner.

To 10.0 g of filter cake (sample; water content: 80% (wt/wt)) of sludge from human waste, 30 ml of an 8% aqueous solution of phosphoric acid containing 2% hydrogen peroxide was added, and then stirred at room temperature for 1 hour. From the resultant mixture of treating liquid and sludge, the sludge was removed by filtering. The contents of the heavy metals in the resultant treating liquid were analyzed by the ICP method. The contents of the heavy metals in the sludge used as the sample and the removing ratios of the heavy metals were as follows: cadmium: 0.39 ppm and 85%, copper: 23.0 ppm and 75%; lead: 2.88 ppm and 83%; and zinc: 125 ppm and 91% .

The removing ratio of copper when treated at 60° C. was 84%.

Example 13

Sludge from food plants was treated in the following manner.

To 10.0 g of filter cake (sample; water content: 83% (wt/wt)) of sludge from the food plants, a 30 ml of a 5% aqueous solution of phosphoric acid containing 2% hydrogen peroxide was added, and then stirred at room temperature for 1 hour. From the resultant mixture of treating liquid and sludge, the sludge was removed by filtering. The contents of the heavy metals in the treating liquid were analyzed by the ICP method. The contents of the heavy metals in the sludge used as the sample and the removing ratios of the heavy metals were as follows: cadmium: 0.28 ppm and 68%; copper: 28.4 ppm and 71%, lead: 3.58 ppm and 72%; and zinc: 85.2 ppm and 89%.

Example 14

Ash generated by incinerating sludge was treated in the following manner.

Five hundred grams of filter cake of sewage sludge (sample; water content: 75% (wt/wt)) was put into a beaker, and the beaker was closed with a watch glass. The beaker was heated to perform dry distillation to decompose organic components, thereby obtaining 27.0 g of ash. Next, 1.0 g of the resultant ash was pulverized, and 15 ml of aqueous solutions containing phosphoric acid at the concentrations shown in Table 5 were each added, each of the aqueous solutions containing 2% hydrogen peroxide, and then was stirred at room temperature for 1 hour. From each of the resultant mixtures of treating liquid and ash, the solid substance was removed by filtering. The contents of the heavy metals in the treating liquid were analyzed by the ICP method. The contents of the heavy metals in the ash used as the sample were as follows (unit: ppm): arsenic: 1260; cadmium: 22.3; chromium: 178; copper: 1360; iron: 37800; mercury: 1270; manganese: 708; nickel: 69.5; lead: 383; and zinc: 2490. The removing ratios of the heavy metals are shown in Table 5.

The removing ratios of the heavy metals obtained at 70° C. using a 40% aqueous solution of phosphoric acid were as follows: copper: 112%; chromium: 151%; and zinc: 109%. In the treatment of the ash generated by incinerating sludge, the amount of heavy metals removed is slightly less than in the case of the sludge.

TABLE 5

| Treating liquid | Removing ratio of heavy metal (%) | | | | | | | | | |
| --- | --- | --- | --- | --- | --- | --- | --- | --- | --- | --- |
|  | As | Cd | Cr | Cu | Fe | Hg | Mn | Ni | Pb | Zn |
| Phosphoric acid (40%) +$H_2O_2$[a)] | 67 | 75 | 91 | 60 | 59 | 90 | 83 | 49 | 45 | 72 |
| Phosphoric acid (20%) +$H_2O_2$[a)] | 71 | 72 | 61 | 61 | 58 | 70 | 91 | 47 | 44 | 78 |

[a)]Concentration of $H_2O_2$ is 2%.

Example 15

An example of treatment of the sewage sludge performed using an aqueous solution containing phosphoric acid and hydrochloric acid as the treating liquid will be described.

To 10.0 g of filter cake (water content: 75% (wt/wt)) of sewage sludge, 15 ml of a 21.25% aqueous solution of phosphoric acid and 15 ml of 1 N hydrochloric acid were added, and then stirred at 70° C. for 1 hour. From the mixture of treating liquid and sludge, the solid component was removed by filtering. The contents of the heavy metals in the resultant treating liquids were analyzed by the ICP method. The removing ratio of copper was 78%.

Example 16

An example of recovery of an aqueous solution of phosphoric acid from the treating liquid will be described.

To 100 g of filter cake (water content: 75% (wt/wt)) of sewage sludge, 300 ml of an 8.5% aqueous solution of phosphoric acid containing 1% hydrogen peroxide was added, and then was stirred at room temperature for 1 hour, thereby filtering the sludge away. Next, the resultant aqueous solution was neutralized with an aqueous solution of 1 N sodium hydroxide. Then, 10 g of the sludge obtained by filtering was added and then stirred for 1 hour, thereby removing the sludge by filtering. The resultant aqueous solution was treated by a cation exchange resin (Amberlight IR-120 (plus)), thereby obtaining an aqueous solution of phosphoric acid. The recovering ratio of phosphoric acid was 89%.

Example 17

An example of preparation of compost using the sludge from which the heavy metals have been removed will be described.

To 3 kg of filter cake (water content: 75% (wt/wt)) of sewage sludge, 9 kg of an 8% aqueous solution of phosphoric acid containing 2% hydrogen peroxide was added, and then was stirred at room temperature for 1 hour. Then, the sludge was removed by filtering, washed with water, and dewatered. The resultant dewatered sludge was fermented while stirring appropriately. About 3 weeks later, 1 kg of compost of a relatively large particle size was obtained.

Example 18

An example of preparation of a fertilizer using the sludge from which the heavy metals have been removed will be described.

To 5 kg of filter cake (water content: 75% (wt/wt)) of sewage sludge, 15 kg of a 10% aqueous solution of phosphoric acid containing 0.5% hydrogen peroxide was added, and then was stirred at room temperature for 1 hour and then dewatered. Sixty grams of slaked lime was added to the resultant mixture while the mixture was stirred, neutralized, and then naturally dried, thereby obtaining about 1.5 kg of fertilizer.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for removing a heavy metal selected from the group consisting of: As, Fe, Cr, Co, Cu, Sn, Pb, Zn, Cd, Hg, Mn, Mo and Ni, from organic sludge, comprising the step of:

putting the sludge into contact with a treating liquid to form a mixture and to transfer the heavy metal contained in the sludge into the treating liquid, wherein:

the treating liquid is formed of either A or B:

(A): an aqueous solution of orthophosphoric acid, condensed phosphoric acid, phosphorous acid or hypophosphorous acid, (B): an aqueous solution of orthophosphoric acid, condensed phosphoric acid, phosphorous acid or hypophosphorous acid containing at least one of B1 and B2:

(B1): at least one acid other than orthophosphoric acid, condensed phosphoric acid, phosphorous acid or hypophosphorous acid, and (B2): at least one oxidant, and wherein the concentration of the orthophosphoric acid, condensed phosphoric acid, phosphorous acid or hypophosphorous acid in the mixture is 3% by weight or more based on the weight of the mixture, and
then separating said sludge from said treating liquid.

2. The method according to claim 1, wherein the organic sludge is at least one member selected from the group consisting of sewage sludge, sludge from human waste and sludge from a food plant.

3. The method according to claim 1, further comprising the step of:

removing the heavy metal from the treating liquid by putting an adsorbent into contact with the treating liquid containing the heavy metal dissolved therein.

4. The method according to claim 1, wherein the heavy metal removed is at least one of mercury and chromium, and the concentration of phosphoric acid is at least 15% by weight.

5. The method according to claim 1, wherein the heavy metal removed is at least one of zinc, copper, arsenic and cadmium, and the concentration of phosphoric acid is 15% by weight or less.

6. A method for removing a heavy metal selected from the group consisting of: As, Fe, Cr, Co, Cu, Sn, Pb, Zn, Cd, Hg, Mn, Mo and Ni, from organic sludge, comprising the step of:

putting the sludge into contact with a treating liquid at a temperature of 40° C. or higher to form a mixture and to transfer the heavy metal contained in the sludge into the treating liquid, wherein:

the treating liquid is formed of either A or B:

(A): an aqueous solution of orthophosphoric acid, condensed phosphoric acid, phosphorous acid or hypophosphorous acid, (B): an aqueous solution of orthophosphoric acid, condensed phosphoric acid, phosphorous acid or hypophosphorous acid containing at least one of B1 and B2:

(B1): at least one acid other than orthophosphoric acid, condensed phosphoric acid, phosphorous acid or hypophosphorous acid, and (B2): at least one oxidant, and wherein the concentration of phosphoric acid in the mixture is from 3% by weight or more, and
then separating the sludge from said treating liquid.

7. The method according to claim 6, wherein the organic sludge is at least one member selected from the group consisting of sewage sludge, sludge from human waste and sludge from a food plant.

8. The method according to claim 6, further comprising the step of:

removing the heavy metal from the treating liquid by putting an adsorbent into contact with the treating liquid containing the heavy metal dissolved therein.

* * * * *